(12) United States Patent
Tomita et al.

(10) Patent No.: US 7,684,133 B2
(45) Date of Patent: Mar. 23, 2010

(54) OPTICAL MODULE

(75) Inventors: Isao Tomita, Tokyo (JP); Masaaki Nido, Tokyo (JP); Taro Kaneko, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 12/021,520

(22) Filed: Jan. 29, 2008

(65) Prior Publication Data
US 2008/0192373 A1 Aug. 14, 2008

(30) Foreign Application Priority Data
Feb. 14, 2007 (JP) ............... 2007-034160

(51) Int. Cl.
G02B 7/02 (2006.01)
(52) U.S. Cl. ..................... 359/820; 359/821
(58) Field of Classification Search ......... 359/819–824; 385/2–14, 32, 33
See application file for complete search history.

(56) References Cited

U.S. PATENT DOCUMENTS

| | | | | |
|---|---|---|---|---|
| 4,750,800 | A * | 6/1988 | Fournier et al. | 385/14 |
| 5,074,630 | A * | 12/1991 | Rodino et al. | 385/14 |
| 6,205,264 | B1 * | 3/2001 | Jin et al. | 385/14 |
| 6,825,997 | B2 * | 11/2004 | Hubbard et al. | 359/819 |
| 6,937,406 | B2 * | 8/2005 | Matsushima et al. | 359/819 |
| 6,963,676 | B2 * | 11/2005 | Zama et al. | 385/14 |
| 7,281,428 | B2 * | 10/2007 | Kim | 73/643 |
| 7,536,911 | B2 * | 5/2009 | Kim | 73/587 |
| 2003/0133641 | A1 | 7/2003 | Yoo | |
| 2005/0129402 | A1 | 6/2005 | Kim et al. | |

FOREIGN PATENT DOCUMENTS

| | | |
|---|---|---|
| EP | 0487509 A2 | 5/1992 |
| EP | 1158326 A2 | 11/2001 |
| EP | 1737090 A1 | 12/2006 |
| GB | 2329486 A | 3/1999 |
| JP | 08-094875 A | 4/1996 |
| WO | 0148542 A2 | 7/2001 |

OTHER PUBLICATIONS

European Search Report for EP Application No. 08001632.2, search completed Jun. 11, 2008.

* cited by examiner

*Primary Examiner*—Mohammed Hasan

(57) ABSTRACT

A thermal contraction stress and a residual contraction stress caused by a difference between the linear expansion coefficients of an optical element unit and a carrier are reduced as much as possible. An optical module includes an optical element unit including optical elements requiring a stress control, and a carrier which supports the optical element unit. As the carrier is made of a material having the same property as that of the substrate material of the optical element, the thermal contraction stress is reduced.

10 Claims, 3 Drawing Sheets

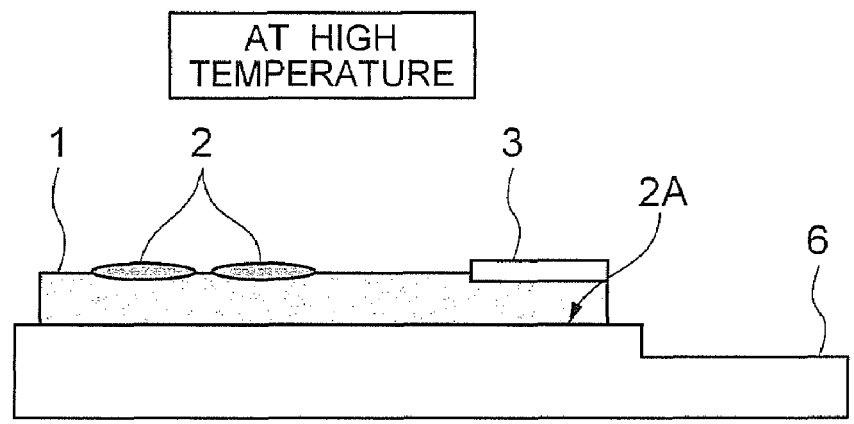
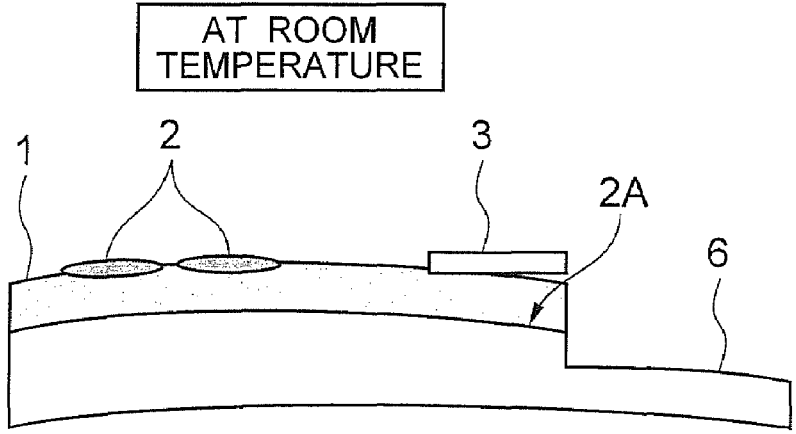
FIG. 3A / FIG. 3B

OPTICAL MODULE

CROSS-REFERENCE TO RELATED APPLICATION

This application is based upon and claims the benefit of priority from Japanese patent application No. 2007-034160, filed on Feb. 14, 2007, the disclosure of which is incorporated herein in its entirety by reference.

BACKGROUND OF THE INVENTION

1. Field of the Invention

The present invention relates to an optical module used for optical fiber communications.

2. Related Art

As optical communication systems have been developed to have larger capacity and operate at higher speed, wavelength division multiplexing communications (D-WDM) are adopted in trunk-line optical communication systems. With such developments, a highly reliable optical module which enables a wavelength control with high accuracy is required as an optical module for D-WDM.

Japanese Patent Laid-Open Publication No. 8-94875 discloses such an optical module, in which an optical unit is accommodated in a package made of a material having a low linear expansion coefficient. According to this optical module, as the thermal expansion and the thermal contraction caused by temperature changes in the package are small so that a stress applied to the optical unit is reduced, it is possible to prevent breakage or an increase in loss variations of optical elements integrated on the optical unit.

On the other hand, in many optical modules for D-WDM, optical elements are operated in a constant temperature using a temperature control element in order to suppress variations in the optical wavelength and the like caused by the changes in the characteristics of the optical elements due to the environmental temperature variation.

Further, as a planar lightwave circuit (PLC) is in the form of a thin chip and the light emitting position thereof is too low to provide light coupling with a lens or with an optical fiber, the height of the optical axis is required to be adjusted. As such, a typical optical module is configured such that an optical unit in which optical elements are mounted on a carrier and the optical axis position of emitted light is adjusted is accommodated in a package. The carrier has a function of improving the mechanical strength of the optical unit and also lowering the heat resistance between the temperature control element and the optical elements to thereby perform constant-temperature operation. Therefore, a firm and highly-thermal conductive material is demanded for the carrier.

For joining a PLC and a carrier, soldering is used for not interrupting conductivity of the joined surfaces. FIGS. 3A and 3B show a conventional optical module in which an optical element and a carrier are soldered. In the optical module of FIGS. 3A and 3B, a substrate 1 in which a ring optical resonator 2 including a PLC and an SOA element 3 are mounted on a carrier 4, and the substrate 1 and the carrier 4 are soldered via a solder joint surface 2A.

However, in soldering the substrate 1 on the carrier 4, it is required to raise the temperature to the melting point of the solder. As the temperature rises, the substrate 1 and the carrier 4 expand according to the properties of the respective materials, and are soldered in the expanded state. When the temperature decreases from such a state to a room temperature for fixing the solder joint, the substrate 1 and the carrier 4 contract according to the properties of the respective materials. If the contraction rates of the substrate 1 and the carrier 4 which are fixed by soldering differ from each other, the substrate 1 will warps with the carrier 4 due to a bimetallic effect as shown in FIG. 3B.

The carrier may be made of copper tungsten (CuW), kovar, or aluminum nitride (AlN) for example, and the linear expansion coefficient of Cu(20)-W is $8.5*10^{-6}$/K, that of kovar is $5.3*10^{-6}$/K, and that of AlN is $4.5*10^{-6}$/K. Generally, a substrate configuring a PLC is made of Si having a linear expansion coefficient of $4.2*10^{-6}$/K which is significantly different from that of CuW or kovar. Although Si and AlN have a relatively small difference in their linear expansion coefficients, if the substrate and the carrier are soldered, a bimetallic effect will be caused as shown in FIG. 3B, so that the stress affects the PLC.

In such an optical module, wavelength variations are caused by the warpage in the substrate configuring the PLC, which causes a problem that the characteristics of the PLC will be changed after the substrate configuring the PLC is mounted on the carrier.

Further, as the warpage in the substrate and in the carrier remains therein as a thermal contraction stress, it is known that the residual contraction stress is released in a high temperature environment or in a thermal cycle environment so that the warpage quantity decreases. As such, there is also a problem that the characteristics of the PLC change during the substrate being mounted on the carrier, in addition to the fact that the characteristics thereof change after it is mounted on the carrier. As such, it is required to reduce the initial thermal contraction stress as much as possible.

SUMMARY OF THE INVENTION

It is an exemplary object of the present invention to provide an optical module capable of suppressing a bimetallic effect to be caused after a drop in the temperature of a substrate configuring a PLC and a carrier which were soldered at a high temperature, and preventing wavelength variations to be caused by warpage in the PLC, to thereby enable a wavelength control with high accuracy.

In order to achieve the object, an exemplary aspect of an optical module according the invention includes an optical element unit including optical elements requiring a stress control, and a carrier which supports the optical element unit. The carrier is made of a material having the same property as that of the substrate material of the optical elements, so that the thermal contraction stress is reduced in the optical module.

Thereby, as an exemplary advantage according to the invention, the problems caused by a thermal contraction stress can be significantly reduced.

BRIEF DESCRIPTION OF THE DRAWINGS

FIGS. 3A and 3B illustrate operating states of a related optical module.

DESCRIPTION OF PREFERRED EXEMPLARY EMBODIMENTS

Hereinafter, an exemplary embodiment of the invention will be described with reference to the drawings.

Referring to FIG. 1, an optical module according to an exemplary embodiment of the invention includes, as the basic configuration, an optical element unit 1 including optical elements 2 requiring a stress control, and a carrier 6 which supports the optical element unit 1. As the carrier 6 is made of a material having the same property as that of the substrate material of the optical elements 2, the thermal contraction stress is reduced in the optical module.

In the exemplary embodiment, as the thermal contraction stress is reduced because the carrier 6 is made of a material having the same property as that of the substrate material of the optical elements 2, the linear expansion coefficients of the substrate material of the optical element 2 and the carrier 6 are the same. Therefore, the optical element unit 1 can be mounted on the carrier 6 while the initial thermal contraction stress, that is, a thermal contraction stress caused when the substrate material of the optical element 2 and the carrier 6 are joined, is reduced as much as possible.

Figure 2A:
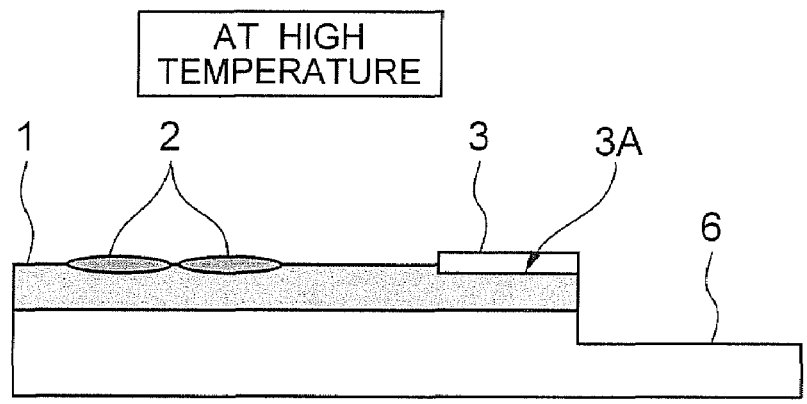
FIGS. 2A and 2B illustrate operating states of the optical module of the first exemplary embodiment shown in FIGS. 1A and 1B.
Figure 2A:
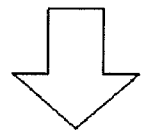
Figure 2B:
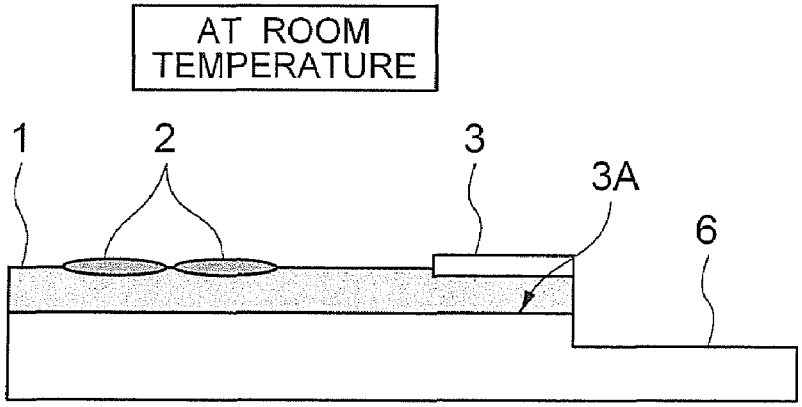

Therefore, since no bimetallic effect is caused at a high temperature as shown in FIG. 2A and also at a room temperature as shown in FIG. 2B, warpage in the optical element unit 1 and the carrier 6 can be prevented.

Next, more detailed description will be given while taking an optical element module according to the exemplary embodiment of the invention as a specific example.

First Exemplary Embodiment

An example in which the exemplary embodiment of the invention is applied to an optical module including a filter, particularly a wavelength filter, requiring a stress control as the optical element 2 will be described as a first exemplary embodiment 1.

Figure 1A:
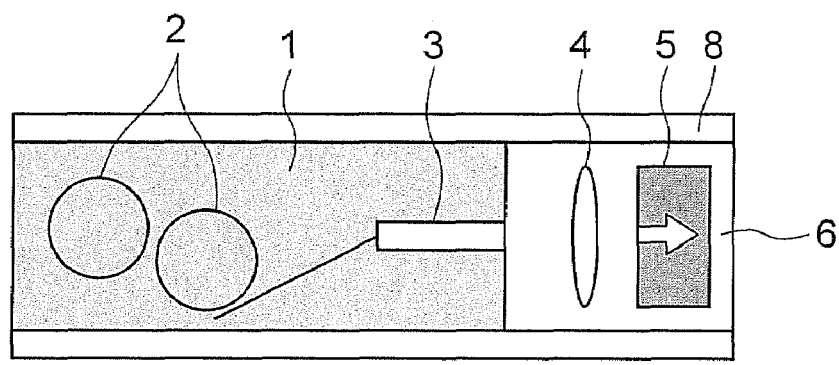
FIG. 1A is a plan view showing the configuration of an optical module according to a first exemplary embodiment of the invention.
Figure 1B:
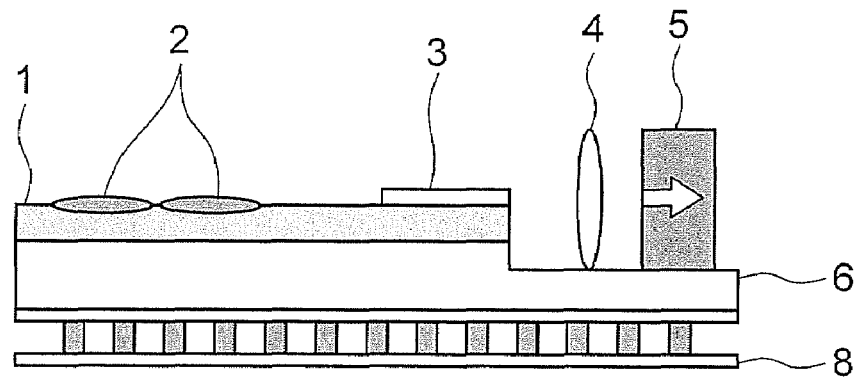
FIG. 1B is a front view thereof.

FIG. 1A is a plan view showing the configuration of an optical module according to the first exemplary embodiment of the invention, and FIG. 1B is a front view showing the configuration thereof. As shown in FIGS. 1A and 1B, the optical module according to the first exemplary embodiment includes an optical element unit 1 and a carrier 6.

The optical element unit 1 includes wavelength filters each including a planar lightwave circuit (PLC), that is, rings resonator 2 particularly, an SOA element 3 as an optical amplifier, a lens 4 for coupling light from the SOA element 3 with an optical fiber, and an isolator 5 which transmits light only to a direction of the optical fiber. The ring resonator 2 and the SOA element 3 are hybrid-integrated on the substrate on which the ring resonators 2 are provided. The lens 4 and the isolator 5 are mounted on the carrier 6 which will be described later. The lens 4 and the isolator 5 may be mounted on the substrate on which the ring resonators 2 are provided, depending on the size. The optical element unit 1 shown in FIGS. 1A and 1B works as a wavelength tunable light source module.

The carrier 6, which supports the optical element unit 1, has heat-conductive characteristics. As the carrier 6 is made of a material having the same property as that of a substrate material of the ring resonator 2, that is, Si for example, the thermal contraction stress is reduced. The thermal contraction stress is a thermal contraction stress which is caused when the optical element unit 1 and the carrier 6 are joined. The carrier 6 is mounted on a Peltier element 8. The Peltier element 8 works as a temperature control element for stress-controlling the rings of the ring resonators 2, that is, for maintaining the temperature of the ring resonators 2 stably.

Each of the ring resonators 2 of the optical element unit 1 shown in FIGS. 1A and 1B includes a PLC as an outside resonator 2. The ring resonator 2 serving as an outside resonator is a wavelength filter which is small and is suitable for mass production. When the ring of the ring resonator 2 is heat-controlled with a heater or the like, it works as a tunable wavelength filter.

The substrate material of the ring resonator 2 of the optical element unit 1 according to the first exemplary embodiment is an Si substrate of about 1 mm thick. The ring resonator 2 is formed in such a manner that a glass thin film is deposited on the Si substrate. Therefore, as the light emitting position from the SOA element 3 which is hybrid-integrated with the ring resonators 2 is at a height of about 1 mm from the bottom of the Si substrate, it is difficult to provide the lens 4 and other optical components (including isolator 5) on the Si substrate. Further, as the Si substrate is as thin as about 1 mm, there is large heat resistance between the ring resonators 2, which are the heat sources, and the Peltier element 8. Therefore, if the heating value of the ring resonators 2 is large, a constant-temperature control is difficult in the high-temperature environment.

In view of the above, the exemplary embodiment adopts a structure in which the optical element unit 1 is soldered to the heat-conductive carrier 6 having a certain level of thickness, and the carrier 6 is fixed to the Peltier element 8. This allows the optical components such as the large lens 4 and the isolator 5 to be mounted on the carrier 6. Further, by lowering the heat resistance between the outside resonators 2 which are the heat sources and the Peltier element 8 by means of the carrier 6, a constant temperature control can be realized easily.

The Peltier element 8, which also works as a heat exchanger, is configured such that a semiconductor element is sandwiched between two plates in which one surface is hot and the other surface is cold. As it is required to operate the outside resonators 2 working as PLC-type wavelength tunable filters at a constant temperature for controlling the wavelength, a thermistor is generally provided on the substrate 1, and heating or cooling is performed by the Peltier element 8 while the temperature is monitored by the thermistor.

The soldering between the optical element unit 1 and the carrier 6 is performed at a high temperature which is risen to the melting point of the solder member. The optical element unit 1 and the carrier 6 are soldered in a state of being expanded according to the properties of the respective materials. Therefore, when the temperature drops to a room temperature, the optical element unit 1 and the carrier 6 contract according to the properties of the respective materials. If the optical element unit 1 and the carrier 6 have different linear expansion rates, the contraction rate of the optical element unit 1 and that of the carrier 6 differ, thereby the optical element unit 1 warps together with the carrier 6 due to a bimetallic effect. In this way, if the linear expansion rate of the optical element unit 1 and that of the carrier 6 are different, a thermal contraction stress and a residual contraction stress is caused to the optical element unit 1, so that the resonance wavelength of the PLC changes. This has been a problem in a wavelength tunable light source module in which high wavelength accuracy is required.

In view of the above, in the optical module of the first exemplary embodiment, the thermal contraction stress is reduced by making the carrier 6 with a material having the same property as that of the substrate material, which is Si for example, of the ring resonator 2. With this structure, the liner expansion coefficients of the optical element unit 1 and the carrier 6 are the same. Therefore, no bimetallic effect is caused even in a room temperature, so that warpage in the optical element unit 1, in particular, warpage in the substrate of the ring resonator 2, can be prevented as shown in FIG. 2B.

Although the optical element unit 1 and the carrier 6 are soldered via the solder joint surface 3A in the optical module according to the exemplary embodiment, the linear expansion coefficients of the optical element unit 1 and the carrier 6 are the same since the carrier 6 is made of a material having the same property as that of the optical element unit 1, in particular, the substrate of the ring resonator. Therefore, effects of the thermal contraction stress and the residual contraction stress which may be applied to the outside resonators 2 can be reduced significantly.

Further, since the linear expansion coefficients of the optical element unit and the carrier, which are soldered, are the same because the carrier is made of a material having the same property as that of the substrate material of the optical resonator including a planar lightwave circuit, no bimetallic effect is caused even when the temperature changes. Therefore, variations in the resonance wavelength of the optical resonator are suppressed, so that the wavelength is controlled with high accuracy.

In the optical module described above, a planar lightwave circuit may form an optical resonator capable of controlling the resonance wavelength tunably. With such a configuration, the amount of stress applied to the optical resonator is reduced, so that variations in the resonance wavelength of the optical resonator due to the stress can be suppressed.

Further, the exemplary embodiment of the invention can similarly be applied to a wavelength filter and an amplitude filter so as to accurately control the wavelength and the amplitude in such filters.

Second Exemplary Embodiment

Although, in the first exemplary embodiment of the invention, a ring resonator which is a tunable wavelength filter is used as an optical element 2 requiring a stress control, the present invention is not limited to this configuration. Instead of a ring resonator, an optical resonator (external resonator) in which the resonance wavelength is variable may be used. As the optical resonator, an array waveguide diffraction element (AWG) which is a wavelength division multiplexing filter including a planar lightwave circuit (PLC) may be used. Further, although a wavelength filter which is an optical resonator is used as an optical element, an optical element is not limited to this. Instead of the wavelength filter, an amplitude filter in which amplitude is controlled variably may be used. As the amplitude filter, a variable amplitude attenuator (VOA) may be used. Further, the optical elements mounted on the carrier 6 may be active elements such as the SOA element 3 in the first exemplary embodiment, or passive elements such as an optical lens, an optical fiber and a thin film filter.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. An optical module comprising:
   an optical element unit including an optical element requiring a stress control;
   a carrier which supports the optical element unit, wherein the carrier is made of a material having a same property as that of a substrate material of the optical element unit, so that a thermal contraction stress resulting upon joining of the optical element unit to the carrier in a high-temperature, thermal manner is reduce; and
   a solder joint between the optical element unit and the carrier to join the optical element unit to the carrier, wherein soldering of the solder joint is to cause the thermal contraction stress reduced by the carrier being made of the material having the same property as that of the substrate material of the optical element unit.

2. The optical module, according to claim 1, wherein the thermal contraction stress is a thermal contraction stress which is caused when the optical element unit and the carrier are joined.

3. The optical module, according to claim 1, wherein the carrier is made of a material having a same property as that of Si which is a substrate material of the optical element unit.

4. The optical module, according to claim 1, wherein the optical element unit is a filter requiring a stress control.

5. The optical module, according to claim 4, wherein the filter is a wavelength filter in which resonance wavelength is tunably controlled.

6. The optical module, according to claim 5, wherein the wavelength filter is a ring resonator including a planar lightwave circuit.

7. The optical module, according to claim 5, wherein the wavelength filter is a wavelength division multiplexing filler including a planar lightwave circuit.

8. The optical module, according to claim 7, wherein the wavelength division multiplexing filter is an array waveguide diffraction element.

9. The optical module, according to claim 5, wherein the amplitude filter is a variable amplitude attenuator.

10. The optical module, according to claim 4, wherein the filter is an amplitude filter in which amplitude is tunably controlled.

* * * * *